Aug. 31, 1954
M. TURAUSKY
2,687,542
GUM SCRAPER AND BRUSH DEVICE
Filed July 17, 1952
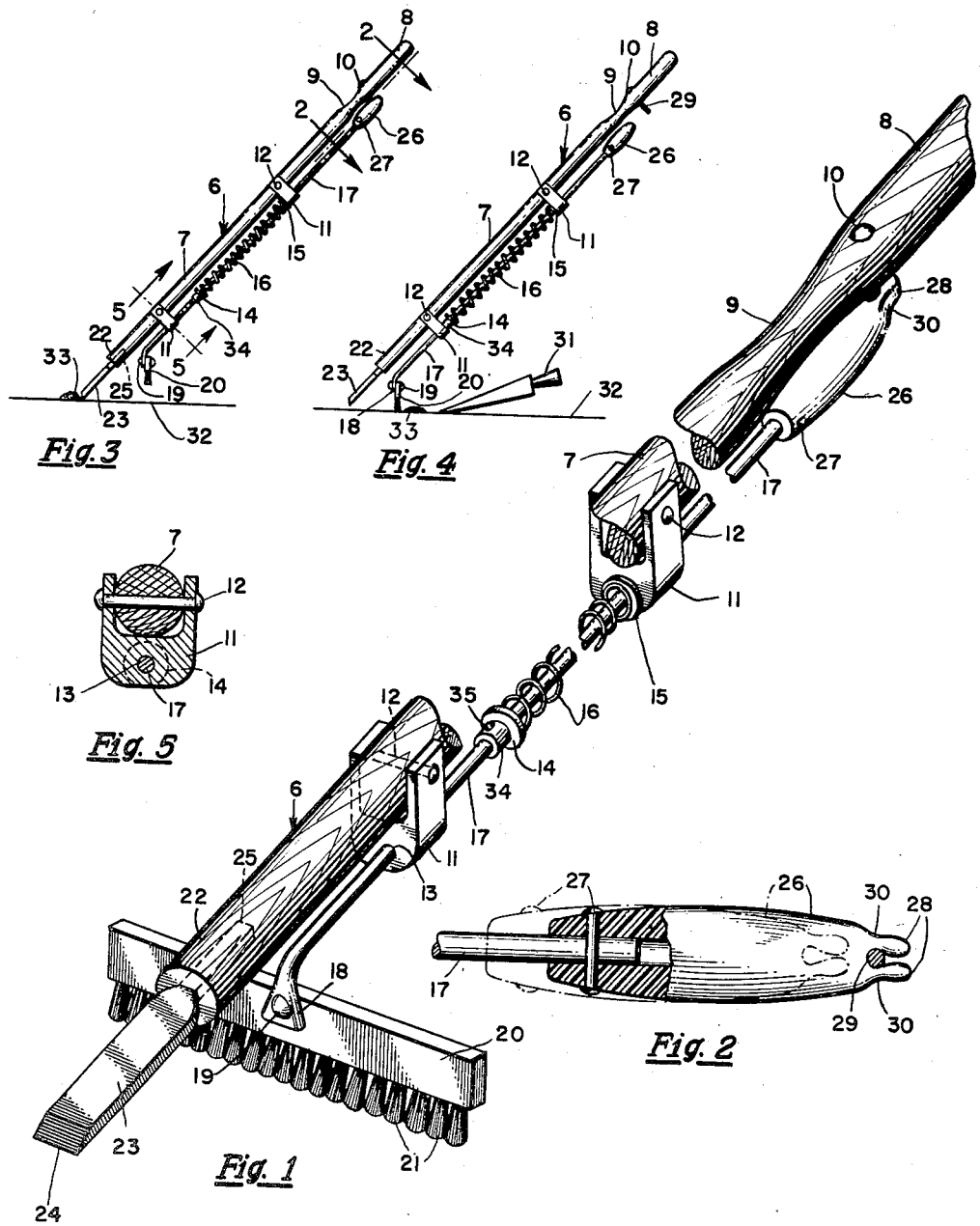
INVENTOR.
Mary Turausky
BY David Manly Heller
Attorney Patented Aug. 31, 1954

2,687,542

UNITED STATES PATENT OFFICE 2,687,542

GUM SCRAPER AND BRUSH DEVICE

Mary Turausky, Chicago, Ill.

Application July 17, 1952, Serial No. 299,390

3 Claims. (Cl. 15—111)

My invention relates to implements which include in combination scraper means and brush means operated alternately on discarded chewing gum that adheres to floor surfaces and other like surfaces.

An important object of my invention is to provide an instrumentality of the aforementioned character whereby the scraper means has mounted in parallel relationship thereto, in either operative or inoperative positions, spring-urged brush means so that after the scraper means loosens a piece of congealed chewing gum from a surface to which it may have been attached, the said brush means is brought into operative position and sweeps the loosened chewing gum from the surface onto a dustpan or other similar collector means.

Another object of my invention is to provide, in an instrumentality of the aforementioned character, operative handle means for the brush means which is mounted in spring-urged relationship normally holding the said brush means in operative position, and further provided with an operative handle equipped with spring-locked means engaging the said brush means in inoperative position whenever it is necessary to relieve the scraper means for action and operation.

A still further object of my invention is to provide handle means for the said scraper means which has a reduced section thereof in registry with the enlarged oval-shaped handle means used in connection with the said brush means, so that the reduced portion will not interfere with the slidable operation of the brush handle means.

A still further object of my invention is to provide an instrumentality of the aforementioned character which is simple in its construction, and which may be manufactured economically in quantity production.

Other objects, ancillary advantages and features inherent in my invention will become apparent from an examination of the accompanying drawings, bearing further elucidation in the ensuing description, wherein like symbols are used to designate like parts, and in which:

Fig. 1 is a perspective view of my invention with certain portions thereof broken away in section depicting clearly the relative structural arrangement of the component parts thereof.

Fig. 2 is an enlarged view of the handle means and the lock means provided thereon which is adapted to be used in connection with the operation of the brush means to operative and inoperative positions; the view is seen looking in the direction of arrows 2—2 on Fig. 3.

Fig. 3 is a side view of my invention showing the scraper means in operative position and the brush means in inoperative position.

Fig. 4 shows my invention adjusted with the brush means in operative position, and the scraper means in inoperative position, indicating that the brush means is utilized to brush or sweep the released gummy material from the support onto a dustpan.

Fig. 5 is a transverse cross-sectional view taken, substantially, on the lines 5—5 of Fig. 3.

Referring to the various views, my invention is, generally, designated 6 and it consists of a scraper support 7 which is a long rod having a terminal portion 22 with a suitable bore therein in order to receive the shank 25 of the scraper 23; the said scraper being equipped with a scraping edge 24 which is sharpened sufficiently in order to scrape up gum-like deposits 33 on supports 32 such as floors and the like.

The other terminal portion of the support 7 is a handle 8 to be conveniently gripped by a person when the instrument or device is to be manipulated or operated on a gum deposit 33. The said handle 8 is provided with a reduced portion 9 which is smaller than the body of the brush handle 26. The said brush handle 26 is made of plastic material and is provided with two locking prongs 28, having weakened portions 30, so as to permit flexure of the said prongs 28 to releasably engage the body of the lock pin 29, which is riveted at 10 to the handle portion 8.

The body of the plastic brush handle 26 is larger than the reduced section 9 so that the same may be easily slid along upwardly and downwardly when the brush support rod 17 slides within the guides 11. The guides 11 are secured to the rod-like support 7 by means of rivets 12 and are provided with bores 13 in which the brush-supporting rod 17 slidably operates. Washers 15 and 14 held in place by collar 34 and pin 35 and edge of guide 11 furnish confinement for the coil spring 16 which encircles the rod support 17; the said rod support 17 has an angularly bent and flattened fishtail portion 18 at one of its terminal portions which is riveted by the rivet 19 to the body 20 of the bristle brush 21. The other terminal portion of the brush rod support 17 has a plastic handle 26 secured thereto by means of rivet 27. The spring 16 normally maintains the brush 21 in operative position as illustrated in Fig. 4.

When it is desired to place the brush in inoperative position the handle 26 is grasped by one hand while the handle 8 is held in the other, and the handle 26 is moved upwardly retrieving the brush thus resulting in the scraper 23 extending beyond the brush 21 setting the scraper in operative position as illustrated in Fig. 3. The prongs 28, being of spring-like action, are caused to engage the pin 29 and thus hold the device in the position of Fig. 3. After the gum 33 has been loosened from the support 32 the handle 26 is pushed downwardly; the spring augmenting the action in unlocking the prongs 28 from their mooring on the pin 29 thus setting the brush 21 in operative position for sweeping the gum 33 onto the dustpan 31 as indicated in Fig. 4.

The device is very simple to operate inasmuch as the two component elements, namely the scraper and the brush, are mounted in parallelism and in superimposed relationship as indicated in Figs. 1, 3 and 4; the handle means of both affording substantial gripping for one hand while the other is manipulated with the remaining hand. The operation is simple and will eliminate the necessity for stooping or kneeling on surfaces 32 in order to effectively remove gum-like deposits 33.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations, and improvements falling within the scope and spirit of my invention, as well as any modifications that are embraced suggestively in the accompanying drawings, and that may come within the purview of the foregoing description; my invention to be limited only by the appended claims.

Having thus described and revealed my invention, what I claim as new and desire to secure by Letters Patent is:

1. A device of the character described for removal of adhesive deposits on surfaces, comprising a handle element, a scraper blade element secured to the lower terminus thereof, guide elements secured to the said handle element, a brush manipulating rod secured slidably in the said guide elements, a brush element secured to the lower terminus of the said brush manipulating rod, a spring encircling the said brush manipulating rod urging the same to operative position normally below the cutting edge of the said scraper blade element, a locking pin means secured to the said handle element, and a locking handle secured to the said brush manipulating rod and provided with resilient locking prongs adapted to engage releasably the said locking pin for locking the said brush in inoperative position above the cutting edge of the said scraper blade element.

2. A device of the character described for removal of adhesive deposits on surfaces, comprising a handle element, a scraper blade element secured to the lower terminus thereof, guide elements secured to the said handle element, a brush manipulating rod secured slidably in the said guide elements, a brush secured to the lower terminus of the said brush manipulating rod, a spring encircling the said brush manipulating rod urging the same to operative position normally below the cutting edge of the said scraper blade element, the said handle element having a reduced portion, a locking pin secured to the said handle element, and a locking handle secured to the said brush manipulating rod and provided with resilient locking prongs adapted to engage releasably the said locking pin for locking the said brush in inoperative position above the cutting edge of the said scraper blade element, the said locking handle being of larger cross-sectional configuration than the said reduced portion and lying therebelow so as to permit gripping and slidable manipulating thereof.

3. A device of the character described for removal of adhesive deposits on surfaces, comprising a handle element, a scraper blade element secured to the lower terminus thereof, guide elements secured to the said handle element, a brush manipulating rod secured slidably in the said guide elements, a brush secured to the lower terminus of the said brush manipulating rod, a spring encircling the said brush manipulating rod urging the same to operative position normally below the cutting edge of the said scraper blade element, the said handle element having a reduced portion, a locking pin secured to the said handle element, a locking handle secured to the said brush manipulating rod for locking the said brush in inoperative position above the cutting edge of the said scraper blade element, the said locking handle being of larger cross-sectional configuration than the said reduced portion and lying therebelow so as to permit gripping and slidable manipulating thereof, a locking pin secured to the said handle element, and resilient locking prongs on the said locking handle releasably engaging the said locking pin.

References Cited in the file of this patent

UNITED STATES PATENTS

| Number | Name | Date |
| --- | --- | --- |
| 597,246 | Pratt | Jan. 11, 1898 |
| 1,282,780 | Dunagan | Oct. 29, 1918 |
| 1,610,657 | Burgee | Dec. 14, 1926 |
| 1,818,917 | Wolf | Aug. 11, 1931 |